March 1, 1932.  N. H. SANDBERG  1,847,263
SYSTEM FOR TREATING WASTE PAPER
Filed Feb. 7, 1929   4 Sheets-Sheet 1

Inventor
Nels H. Sandberg
By Caswell & Sagaard
Attorneys

March 1, 1932. N. H. SANDBERG 1,847,263
SYSTEM FOR TREATING WASTE PAPER
Filed Feb. 7, 1929 4 Sheets-Sheet 3

Inventor
Nels H. Sandberg
By Caswell & Fagaard
Attorneys

March 1, 1932. N. H. SANDBERG 1,847,263
SYSTEM FOR TREATING WASTE PAPER
Filed Feb. 7, 1929 4 Sheets-Sheet 4

Inventor
Nels H. Sandberg
By Caswell & Jagaard
Attorneys

Patented Mar. 1, 1932

1,847,263

UNITED STATES PATENT OFFICE

NELS H. SANDBERG, OF MINNEAPOLIS, MINNESOTA, ASSIGNOR TO WALDORF PAPER PRODUCTS COMPANY, OF ST. PAUL, MINNESOTA, A CORPORATION OF MINNESOTA

SYSTEM FOR TREATING WASTE PAPER

Application filed February 7, 1929. Serial No. 338,178.

My invention relates to systems for and the method of treating paper, and has for its object to provide a method and system whereby waste paper and similar substances may be readily collected, sorted and distributed with a minimum amount of effort and expense, and in a minimum length of time.

Another object of the invention resides in providing a method and a system whereby economy of space may be effected and by which the various superimposed floors of a building may be advantageously utilized.

Another object of the invention resides in the method of treating paper which consists in collecting the paper from various sources and bringing the same to a common conveying means, in delivering the paper to a number of sorters, and in distributing paper from the sorters to suitable bins.

A still further object of the invention resides in the method of treating paper which consists in weighing the paper at a point between the sorters and the various sources.

A still further object of the invention resides in the system for treating paper which comprises a traveling carrier having a series of sorters arranged in groups on either side of the path of travel of said traveling conveyor so as to permit of the discharge of the traveling carrier into any of said sorters.

An object of the invention resides in providing at the end of said rows of sorters, a series of bins, and in disposing along said bins a discharge conveyor adapted to receive certain grades of paper from said sorters, and to selectively discharge the same into any of the number of said bins.

Another object of the invention resides in providing along each of said rows of sorters a plurality of conveyors, some of which are adapted to discharge into some of said bins directly, and others of which are adapted to discharge upon said discharge conveyor.

Other objects of the invention reside in the details of construction and in the novel combination and arrangement of parts hereinafter illustrated or described.

In the use of waste paper for the manufacture of paper products, considerable time and expense is incurred in the sorting of the paper for the most advantageous use thereof. In addition, considerable space is required in treating the paper, and interruptions and lack of continuity of the system occur. The present invention overcomes these disadvantages in a manner which will presently become apparent.

Figure 3:
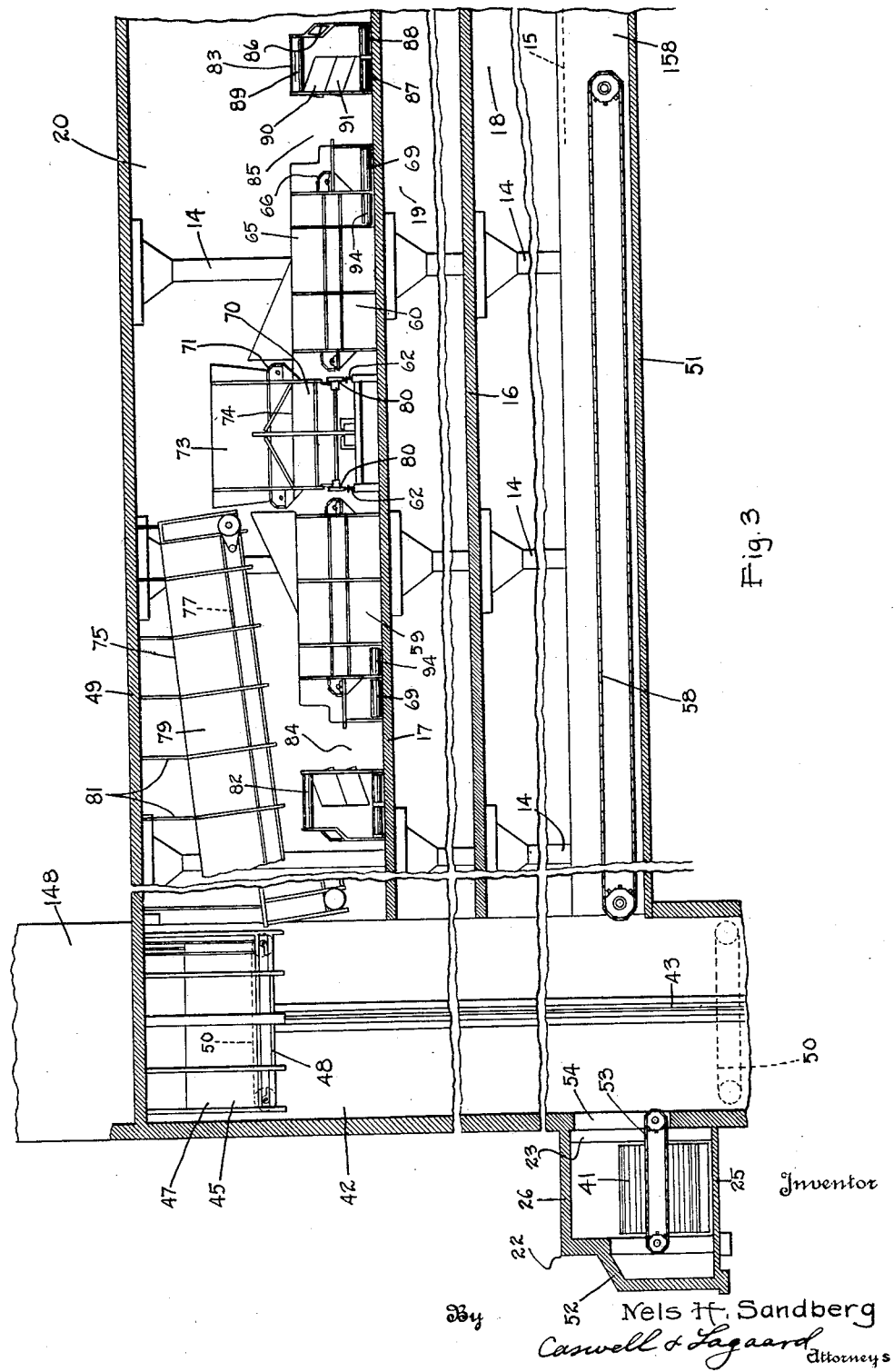
Fig. 3 is a sectional view taken substantially on line 3—3 of Fig. 2.

For the purpose of illustrating the application of my invention, I have shown an ordinary building A which may be of the post and girder type of construction or any other suitable type, and which is provided with three outer walls 10, 11 and 13, and a fourth outer wall not shown in the drawings, and which is further arranged with posts 14 disposed between the various floors of the building. The building may be constructed in several stories as illustrated in Fig. 3 and designated at 18, 19 and 20, said stories being lower, intermediate and upper stories respectively. Although only one intermediate story 19 has been shown, it can readily be understood that any number of stories may intervene between the upper story 20 and the lower story 18, dependent upon the capacity of the bins desired in use in conjunction with the invention. These intermediate stories, except for the space therein occupied by the bins for sorted paper, may be utilized for other purposes, as for the storage of raw or baled paper or for manufacturing purposes if desired. The ground floor of the building A is designated at 15 while the intermediate and upper floors are respectively designated at 16 and 17.

Figure 1:
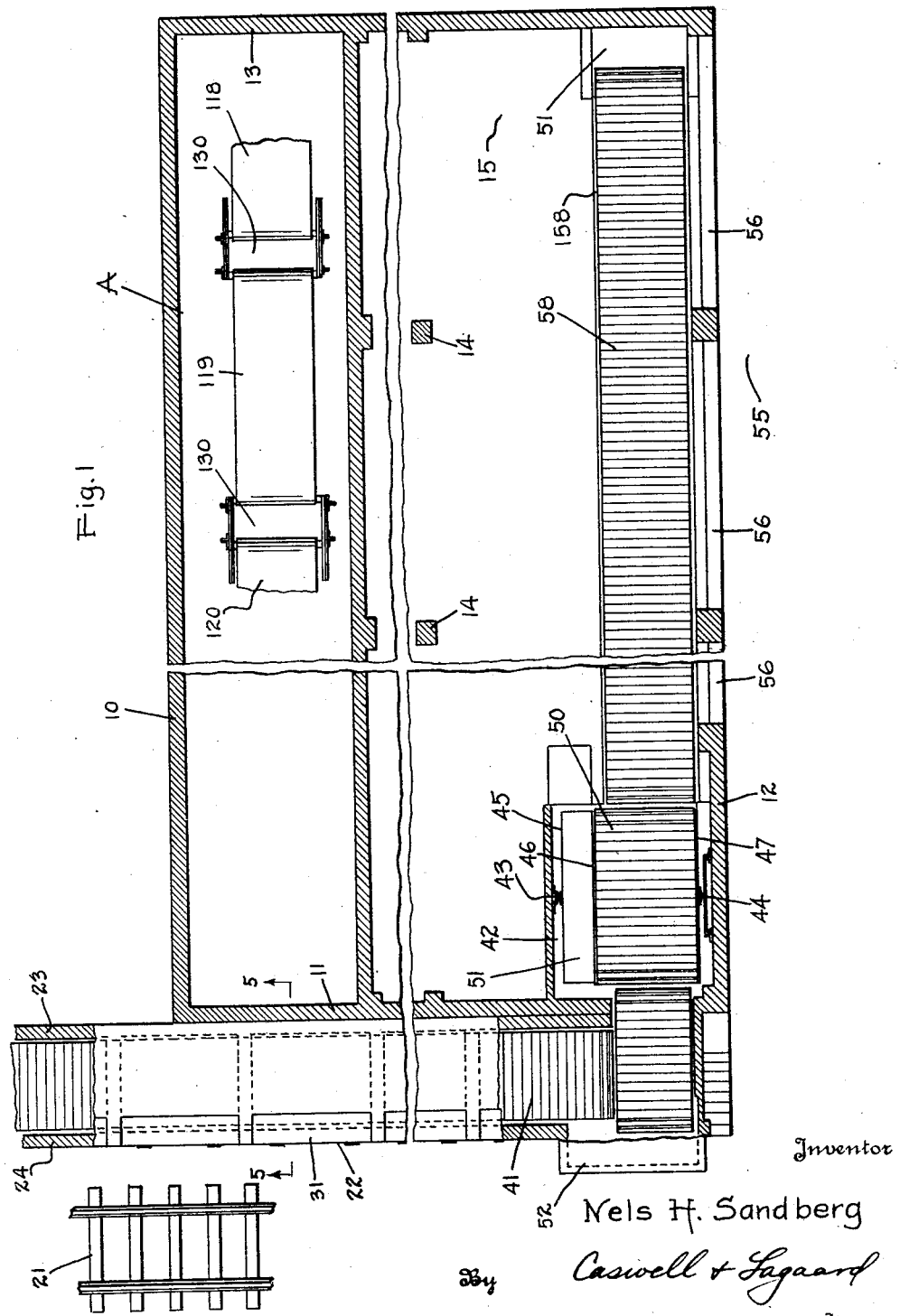
Fig. 1 is a plan view of the ground floor of a building illustrating the installation of a portion of a system embodying the principles of my invention and adapted to carry out the method thereof.
Figure 5:
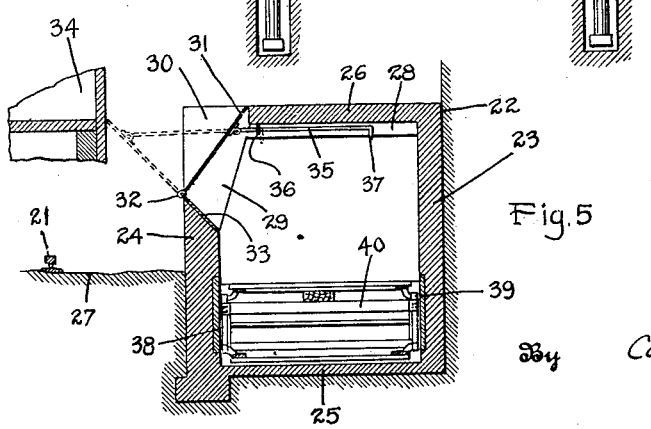
Fig. 5 is a fragmentary cross sectional view taken on line 5—5 of Fig. 1 and drawn to a larger scale.

The portion of the invention illustrated in Fig. 1 comprises the receiving division of the system. Along the wall 11 of the building and spaced therefrom is run a railroad spur or siding 21. Between this siding and said wall is constructed a tunnel-shaped structure indicated in its entirety by the numeral 22 and shown in detail in Fig. 5. This tunnel-shaped structure comprises side walls 23 and 24, a lower floor 25 and an upper floor 26 which serves as a closure for the upper portion of the tunnel. The tunnel structure 22 is preferably sunk beneath the ground level 27 so that the lower floor 25 rests directly upon the ground. The upper floor 26 is carried by a number of transverse girders 28 which rest at one end upon the wall 23 and are carried at their opposite ends by short columns 29 issuing upwardly from the uppermost portion of wall 24 which, as illustrated, is somewhat lower than the wall 23 to provide a number of longitudinal openings 30 into the tunnel structure along the entire length thereof and between the various columns 29. The various openings 30 are adapted to be closed by means of swinging closures 31 which are hinged at 32 to plate-like structures 33 rigidly anchored to the upper portion of the wall 24 between the various columns 29. The closures 31 are adapted to swing from the position shown in full lines in Fig. 5, to close the opening 30 to the tunnel-shaped structure, or to swing outwardly as shown in dotted lines so as to lean up against the side of a box car 34 standing upon the siding 21. The movement of the closures 31 are limited by means of rods 35 which are pivoted to said closures and are slidable along keeper 36 attached to the tunnel-shaped structure proper. These rods are constructed at the ends thereof with hooks 37 adapted to engage keepers 36 and to hold the closures 31 in their outermost positions as shown in dotted lines in Fig. 5. It will be noted that the plates 33, to which the closures 31 are pivoted, are arranged so as to be substantially continuous with said closures when in open position so as to permit of readily feeding the paper into the tunnel from the box car 34.

Along the lowermost portion of the tunnel 22 is disposed a framework consisting principally of two longitudinal frame members 38 and 39, and a number of cross frame members 40 connected to said longitudinal frame member and secured to the walls 23 and 24 of said tunnel. This framework is adapted to carry an endless traveling conveyor 41 which is preferably of the slatted type and which may be driven from any suitable source of power in the customary manner. Upon feeding the paper from any of the box cars on the siding 21 and into any of the openings 30, said paper is deposited upon the upper run of the conveyor 41 and is carried by said conveyor and along the building toward the discharge end of said conveyor.

Within the building A and located at the corner formed by the wall 11 and a cross wall 12 thereof, situated intermediate the ends of the building and extending through all of the stories, is constructed an elevator shaft 42. This elevator shaft is provided with guides 43 and 44 which are adapted to guide an elevator car 45. The elevator car 45 is constructed with side walls 46 and 47 and a bottom 48 and is adapted to be suspended through a suitable cable or otherwise, and is operable by means of a power transmission mechanism disposed within a pent house 148 situated upon the roof 49 of the building A. Such construction, being well known in the art and forming no particular feature of this invention, has not been disclosed in detail in this application. Mounted upon the floor 48 of the elevator car 45 is a conveyor 50 which extends from one length of the car to the other and between the walls 46 and 47 thereof. This conveyor may be operated by an attendant standing upon a platform 51 of the elevator car 45 and the raising and lowering of the elevator may likewise be controlled by the operator, while standing on said platform, through suitable controls not illustrated.

At the end of the tunnel 22 adjacent the elevator shaft 42, is formed an extension 52 which together with the end of said tunnel structure, provides a housing for a short transverse conveyor 53 extending through an opening 54 in the wall 11 and into the elevator shaft 42. This conveyor is disposed somewhat above the conveyor 50 on the elevator car 45 when in its lowermost position so as to discharge thereon. The said conveyor 53 is adapted to receive the discharge from the conveyor 41 and to transfer the paper carried by said conveyor directly upon the conveyor 50 of the elevator car 45. In the preferred installation of my invention, the elevator shaft 42 is carried down deep enough so that the conveyor 53 is disposed below the level of the conveyor 41. However, where the system is to be installed in a building having an elevator with a shallow elevator pit, the conveyor 53 may be located at the desired elevation and the discharge end of conveyor 41 raised sufficiently at its discharge end to cause the said conveyor to discharge upon conveyor 53. In either event, the results would be the same; namely, to discharge the paper from the car directly upon the elevator conveyor 50.

In addition to the unloading system for box cars, an unloading system for trucks is employed. For this purpose a drive way designated at 55 is arranged directly into the building and adjacent the wall 12 of said building. The wall 12 is provided with suitable openings 56 formed in the said wall whereby paper brought to the plant in trucks might be unloaded and delivered upon the lower floor 15 of the building. Along the wall 12, the floor 15 of the building A is depressed as indicated at 57 to form a trough 158 best shown in Figs. 1 and 3. This trough leads up to and communicates with the elevator shaft 42. Within this trough is disposed an endless conveyor 58 of the slatted type similar to the conveyor 41 which directly discharges into the elevator shaft 41 and upon the conveyor 50 of the elevator car 45 when in its lowermost position. The paper taken from trucks parked adjacent the wall 12 may be directly deposited upon the conveyor 58 and carried to the elevator 45. As before stated, the various conveyors utilized in my invention may be driven or operated by any suitable means which, being well known in the art, have not been illustrated in detail in this application. With the particular installation described, paper from railway cars or trucks may be simultaneously delivered to the elevator 45 where the same may be raised to the upper floors of the building where the paper is sorted and distributed in a manner to be presently described. It is to be noted that both conveyors 41 and 58 may be controlled both by the operator on the elevator car or those loading the conveyor. To prevent the discharge of the paper accidentally into the empty pit, an automatic safety device may be employed or an attendant stationed at the pit.

In conjunction with the elevator 45, I employ a weighing apparatus whereby the paper carried by the elevator 45 may be weighed prior to its discharge therefrom. This apparatus is being disclosed in a companion application and has hence not been shown in this application. With this arrangement, all of the paper entering the plant is weighed by the same weighing apparatus so that errors through the use of different scales may be completely eliminated and so that failure to weigh the paper is greatly lessened.

Figure 2:
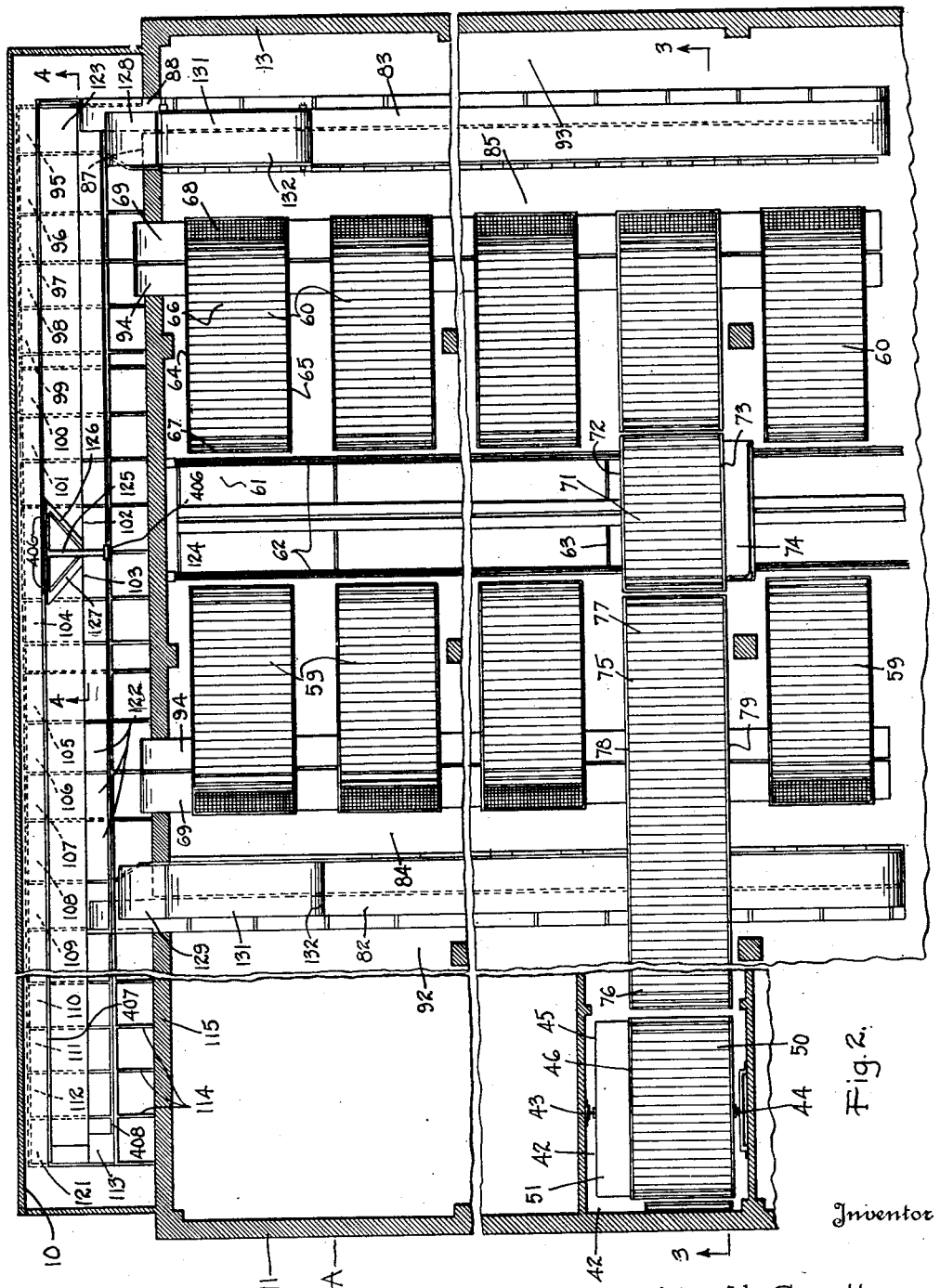
Fig. 2 is a plan view of an upper floor of the building illustrated in Fig. 1, illustrating further portions of a system embodying my invention.

Within one of the upper stories of the building A, such as the upper story 20, is installed the distributing and sorting portion of the system which is best illustrated in Figs. 2 and 3. The elevator shaft 42 appears in the same relative position with respect to the walls of the building. In the upper floors of the building the same extend over the drive way 55 bringing the elevator 45 more nearly in the center of the building along the wall 11 thereof. Extending longitudinally of the building within the story 20 thereof are arranged two rows of sorters designated at 59 and 60. These rows of sorters are spaced from one another to form an aisle 61 therebetween. Along this aisle is constructed a track 62 which supports a traveling carrier 63 best shown in Fig. 2. The sorters 59 and 60 are identical in construction and consist primarily of side walls 64 and 65 and end walls 67 supported in spaced relation to one another. Between these side walls are arranged endless conveyors 66 which extend from the end walls 67 and up to the forward ends of the sorters and serve to deliver the paper placed thereon upon working tables 68 at the forward ends of the sorters. These tables are preferably perforate to permit of the passage of dust and other waste materials therethrough which are discharged upon an endless conveyor 69 disposed below said tables and extending throughout the entire length of the row of sorters. The exact construction of the sorters used in conjunction with the invention may be found in a companion application for patent filed December 27, 1929, Serial No. 356,727, covering the same in detail.

The traveling carrier 63 comprises a frame structure 70 supported upon a number of wheels 80 which roll along the track 62. Supported upon this frame structure is an endless conveyor 71 which is disposed at an elevation above the end walls 67 of the various sorters 59 and 60. Side walls 72 and 73 above this conveyor form a compartment for the reception of paper which may be discharged from the said conveyor over either end thereof and into any of the respective sorters 59 and 60. The traveling carrier 63 is provided with an operator's platform 74 from which the movement of the carrier along the track 62 may be controlled and from which the conveyor 70 may be operated. The carrier 63 is fed by an inclined conveyor 75 which is disposed between the elevator shaft 42 and the track 62 and which is arranged with its receiving end 76 below the conveyor 50 when at its uppermost position and with its discharge end 77 above the elevation of the conveyor 71. This conveyor may be operated to carry the paper discharge from the elevator 45 to the traveling carrier 63 from which the said paper may be discharged into any of the sorters 59 and 60. In the installation illustrated the conveyor 75 is inclined so as to rise above the sorters 59 in order not to interfere with the operation thereof or to the use of the space available for such sorters. The conveyor 75 may be constructed with side walls 78 and 79 and is preferably suspended from the roof 49 of the building by means of suitable hangers 81.

The traveling carrier 63 may be constructed with a scale whereby the quantity of paper discharged into each of the various sorters 59 and 60 may be accurately determined. This permits of checking the total amount of paper entering the plant, and at the same time may be utilized for weighing the paper delivered to each sorter which may be made to serve as a basis of the remuneration of the persons sorting the paper. The weighing of the paper together with the handling of the traveling carrier 63 may be accomplished by an operator upon platform 74 who has a clear view of the entire surroundings from his position upon said platform.

Along the ends of the sorters 59 and 60, at which the tables 68 thereof are disposed, are arranged two distributors 82 and 83 which are spaced from the said sorters to provide aisles 84 and 85 therebetween. In addition, said distributors are spaced from the adjoining structure within the story 20 to provide other aisles 92 and 93 on the sides thereof opposite the aisles 84 and 85 for a purpose to be presently described. These distributors are identical in construction and only distributor 83 will be described in detail. This distributor comprises a framework 86 which supports two lower conveyors 87 and 88 which are positioned close to the floor 17 of the building. At the top of the distributor is arranged a third conveyor 89 which is free along the upper run thereof. Between the conveyor 89 and the conveyor 87 is arranged a series of receptacles 90 and 91 which are open at the front to permit of the placing of waste paper therein, and which are normally closed at the rear. The closures for these receptacles may be opened by an attendant while stationed in the aisle 93, and due to the inclination of the walls of said receptacles, the contents thereof is caused to be discharged upon the conveyor 88 when the closures for said receptacles are opened. Both sets of receptacles 90 and 91 are spaced above the conveyor 87 so that the paper may be placed directly upon the said conveyor.

In conjunction with the sorters 59 and 60, two additional conveyors are employed for each row of sorters designated at 69 and 94, of which the conveyors 69 were previously described as receiving and removing the discharge from the tables 68. Both of these conveyors serve to remove the sorted paper from the sorters in a manner to be presently described. These conveyors, as well as the various other conveyors of the distributors, extend the entire length of the system.

Figure 4:
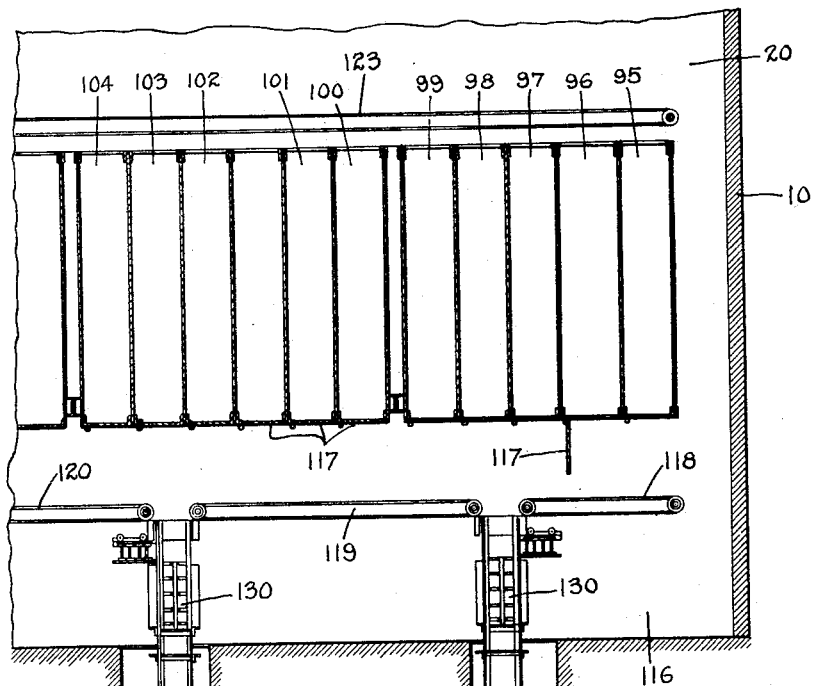
Fig. 4 is a fragmentary sectional view taken on line 4—4 of Fig. 2.

Along the wall 10 of the building is arranged a row of bins numbered from 95 to 113 inclusive. These bins are formed by a number of division walls 114 which extend between the wall 10 of the building and another wall 115, parallel with said wall 10 and extending the entire width of the building. These division walls fall short of the lower floor 15 of the building so as to provide a room 116 therebelow as best shown in Fig. 4. At the bottom of each of these bins is provided a trap door 117 which may be lowered to discharge the contents of the bins upon a number of conveyors 118, 119 and 120 positioned immediately below said trap doors. The upper portions of the various bins are partially closed by means of a floor 121. The said bins are further closed by means of individual doors 122 which are hingedly connected to the upper portions of the division walls 14 in a manner so as to completely close the upper ends of the bins or to swing toward the wall 115 to provide an opening to any of the various bins. Along the floor 121 is arranged a conveyor 123, one edge of which is close to the edge of the floor 121. Above this conveyor is mounted a discharge or unloading device 124 by means of which paper carried by the said conveyor may be shifted laterally from the said conveyor and deposited into any of the openings leading to any of the various bins formed by the proper movement of the doors 122. This device comprises a framework 125 which journals a number of wheels 406 adapted to ride upon two rails 407 and 408 supported upon the floor 121 and the division walls 114. The said structure, in addition, includes two inclined deflectors 126 and 127 which lie close to the upper run of the conveyor 123. Paper discharged upon this conveyor, striking one or the other of the deflectors 126 and 127, is shifted laterally from the upper surface of said run of the conveyor and discharged into the particular bin along which the device is positioned. By moving the entire structure along the rails 407 and 408, the device may be made to operate to cause the paper carried by the conveyor to be discharged into any of the bins.

The conveyors 88 of the distributors 82 and 83 are so arranged as to discharge upon the conveyor 123. All of the paper deposited upon said conveyors 88 is hence carried by the conveyor 23 to the unloading device 124 where the same may be deposited in the proper bin. Conveyors 89 of the two distributing devices 82 and 83 are connected to hoppered spouts 128 and 129 by means of which the paper discharged therefrom is directly deposited into the two bins 95 and 109 respectively. In a similar manner, conveyors 94 and 69 of the sorters 60 deposit directly into the bins 98 and 97, while the same conveyors of sorters 59 deposit into bins 107 and 106.

Within the room 116 of the building and below the bins 95 to 113 are positioned a number of paper balers 130 which may be of the hydraulic type or of any other desired type. These balers are disposed between the various conveyors 118, 119 and 120, and are adapted to receive the discharge therefrom. As the paper is deposited from the various bins to the said conveyors, the said conveyors are driven in the required direction to deliver the paper to the particular baler desired. From the balers, the paper may be trucked to suitable storage space on the same floor on which the balers are located and subsequently delivered to the paper mill, or the same may be loaded on cars or trucks for shipment away from the sorting plant.

With my improved system, all of the conveyors are independently driven and provided with suitable controls so that the same may be operated in close proximity thereto. In addition thereto where necessary, the conveyors run in either direction in accordance with the particular requirements. In the use of the system and method of my invention the following procedure is preferable though many variations may be made without departing from the spirit of my invention. The operator stationed upon the platform 51 of the elevator car 45 controls the said elevator and also the conveyors 41, 53 and 58. When the elevator has been lowered to its lowermost position to bring the conveyor 50 in position shown by dotted lines in Fig. 3, the operator starts either conveyor 41 or 58 as the case may be and causes the paper deposited thereon to be transferred to the elevator car 45 and upon the conveyor 50. Conveyor 58 being exposed from above is visible to those loading said conveyor from the trucks and the paper is preferably distributed by such loaders in a uniform manner upon said conveyor and within the trough 158. As soon as the elevator car is loaded, the conveyors 41 and 58 are stopped and the load of paper weighed. The elevator is then raised to the upper story 20 where the paper from the conveyor 50 may be discharged upon the conveyor 75. As the loading continues, the operator removes the paper from the two conveyors 41 and 58 in accordance with the rapidity with which the same are loaded, so as to keep the said conveyors as nearly clear as possible at all times.

The traveling carrier 70 is controlled by an operator standing upon the platform 74. This carrier is adapted to receive the paper discharged by the conveyor 75 which latter conveyor is controlled by either the elevator operator or by the traveling carrier operator. The capacity of the traveling carrier 70 is considerably greater than the capacity of the elevator car so that the load of paper carried by the elevator may be easily received within the traveling carrier. As soon as the carrier 70 has been loaded, the operator moves the same along the track 62 until the said carrier is opposite one or the other of the sorters 59 and 60. The conveyor 71 of said carrier may then be operated in the proper direction to cause the paper carried thereby to be discharged into the particular sorter desired. As the paper is deposited upon the elevator car 45, said paper is weighed by the operator of said car as previously stated and when the paper is loaded upon the carrier 71, the same is again weighed by the operator of said carrier. This serves to check the weight of the paper handled by the system and at the same time forms a basis for remuneration of the sorters, each of whom is credited with the weight of paper delivered to him and sorted.

For the purpose of sorting the paper, an operator is employed for each sorter who works along the respective aisles 84 and 85 and between the sorting tables 68 of the respective sorters and the distributors 82 and 83. By means of suitable controls, the conveyors 66 of the respective sorters may be moved to cause the paper carried thereby to be delivered upon the work tables 68. The paper is then manually removed from the said tables, classified and disposed of by the operator. All of the waste material, dirt and other débris is placed upon the conveyors 69 and discharged into the bin 97 or the bin 107. These conveyors, in addition, also discharge into said bins dirt and dust which drops through said perforate tables. The conveyors 94 are used for conveying the grade of paper which is most commonly found with the waste paper sorted. These conveyors may be used for newspaper or for any other grade preferred. The conveyors 87 of the distributors 82 and 83 are utilized for the grade of paper which is next in prominence with that removed by the conveyors 94. All other grades of paper are distributed in the various receptacles 90 and 91 which are properly labeled for identification. Whenever boxes or other paper in crushable form is found by the operator operating the sorter, the same is placed upon the upper runs of the conveyors 89 which are exposed for this purpose. At the end of each of these conveyors 89 are disposed crushers 131 which comprise short inclined belts 132 which serve to crush the boxes or other similar paper and to discharge the same into the hoppered spouts 128 and 129 in relatively flat form. These crushers forming the subject matter of a companion application for patent filed July 8, 1929, Serial No. 376,797 have not been described in detail. As the various receptacles 90 and 91 become filled, an attendant operating along the aisles 92 and 93 opens the various closures for the the proper receptacles and removes each grade of paper, one grade at a time, and deposits it upon the conveyors 88. These conveyors convey the paper to the conveyor 123 from which the paper is conveyed to the unloading device 124 and discharged in the proper bin. All of the conveyors 69, 94, 87, 88 and 89 are continuously operating while the conveyor 123 may be operated in the proper direction to cause the paper to discharge into the proper bin. Due to such continuous operation, the paper is removed and distributed at a rapid rate, enabling the operators at the sorters to handle large quantities of paper in a minimum length of time. The attendant removing the paper from the receptacle 90 and 91 also controls the operation of the conveyor 123 and the unloading device 124. As the various bins 95 to 113 become filled, this attendant notifies an attendant within the room 116 who removes the paper from the said bins by the opening of the doors 117 and delivers the same to the balers 130 where the paper is baled and subsequently removed.

My invention is highly advantageous in that it permits of the treating of large quantities of paper in a minimum amount of space and by utilizing several stores of the same building for this purpose. The paper, as it enters the system and leaves the system, is at the same elevation so that a minimum amount of handling and moving of the paper occurs. The system is exceedingly economical in so far as the cost of treating the paper is concerned, and a relatively short length of time is required for the passage of the paper through the system.

Changes in the specific form of my invention, as herein disclosed, may be made within the scope of what is claimed without departing from the spirit of my invention.

Having described my invention, what I claim as new and desire to protect by Letters Patent is:

1. A system for treating paper comprising a centrally disposed traveling carrier, means for feeding paper upon said carrier, a plurality of sorters disposed on either side of the path of travel of said carrier, said carrier being adapted to discharge the paper carried thereby to any of said sorters, a plurality of conveyors positioned along the rows of sorters, a series of bins arranged in a row along one end of said rows of sorters and extending at right angles to the direction of travel of said traveling carrier, a conveyor extending in the same direction as said bins and positioned in proximity thereto, one of each of said distributing conveyors being adapted to feed upon last named conveyor, others of said distributing conveyors feeding directly into some of said bins, and means for selectively discharging the paper from said last named conveyor to any of a number of said bins.

2. A system for treating paper comprising a series of sorters arranged in rows, means for feeding paper into said sorters at the same ends thereof, a plurality of distributing conveyors disposed in proximity to said sorters at the other ends thereof, a series of bins, a discharge conveyor positioned in proximity to said distributing conveyors, some of said distributing conveyors being adapted to feed upon said discharge conveyor, and others of said distributing conveyors being adapted to feed into some of said bins, and means for selectively discharging from said discharge conveyor into any of a number of said bins.

In testimony whereof I have affixed my signature to this specification.

NELS H. SANDBERG.